US008510440B2

(12) United States Patent
Coleman et al.

(10) Patent No.: US 8,510,440 B2
(45) Date of Patent: Aug. 13, 2013

(54) SIMULATION OF COMPUTER APPLICATION FUNCTION TO ASSIST A USER

(75) Inventors: Andrew Coleman, Vestal, NY (US); Janet E. Geddes, Endwell, NY (US); Michael R. May, Johnson City, NY (US)

(73) Assignee: International Business Machines Corporation, Armonk, NY (US)

( * ) Notice: Subject to any disclaimer, the term of this patent is extended or adjusted under 35 U.S.C. 154(b) by 2053 days.

(21) Appl. No.: 10/226,727

(22) Filed: Aug. 22, 2002

(65) Prior Publication Data

US 2004/0039828 A1 Feb. 26, 2004

(51) Int. Cl.
*G06F 15/173* (2006.01)

(52) U.S. Cl.
USPC .......... 709/225

(58) Field of Classification Search
USPC .......... 709/225
See application file for complete search history.

(56) References Cited

U.S. PATENT DOCUMENTS

| | | | | |
|---|---|---|---|---|
| 5,836,011 | A | 11/1998 | Hambrick et al. | |
| 6,052,674 | A | 4/2000 | Zervides et al. | |
| 6,236,989 | B1 * | 5/2001 | Mandyam et al. | 707/4 |
| 6,298,457 | B1 * | 10/2001 | Rachlin et al. | 714/49 |
| 6,321,231 | B1 | 11/2001 | Jebens et al. | |
| 6,490,574 | B1 * | 12/2002 | Bennett et al. | 706/47 |
| 6,609,151 | B1 * | 8/2003 | Khanna et al. | 709/222 |
| 6,650,747 | B1 * | 11/2003 | Bala et al. | 709/224 |
| 6,973,482 | B2 * | 12/2005 | Mohammed et al. | 709/208 |
| 7,127,745 | B1 * | 10/2006 | Herse et al. | 726/30 |
| 7,197,562 | B2 * | 3/2007 | Murtha et al. | 709/224 |
| 2002/0087650 | A1 * | 7/2002 | Fagerburg et al. | 709/208 |
| 2003/0061323 | A1 * | 3/2003 | East et al. | 709/223 |
| 2003/0065731 | A1 * | 4/2003 | Mohammed et al. | 709/225 |

FOREIGN PATENT DOCUMENTS

| | | |
|---|---|---|
| GB | 2 350 211 A | 11/2000 |
| JP | 2001-175729 | 6/2001 |
| WO | WO 99/15989 | 4/1999 |

OTHER PUBLICATIONS

Research Disclosure "Software Package Installation Control", Aug. 2001, pp. 1435-1436.
MLA "Bulletin of the Medical Library Association" vol. 85, No. 3, Jul. 1997, pp. 260-268.
"A Consistency Model for Team Cooperation" *B. Peuschel. W. Schäfer and S. Wolf* (1993) IEEE, pp. 114-116.

(Continued)

*Primary Examiner* — F. Zeender
*Assistant Examiner* — Christopher Buchanan
(74) *Attorney, Agent, or Firm* — Scully, Scott, Murphy & Presser, P.C.; William E. Schiesser

(57) ABSTRACT

A method and system for assisting a user having a role and a qualification. In accordance with this method, a software tool is provided that is adapted to limit a user to a functional limitation predefined by a first role and a data access limitation predefined by a qualification. The method comprises the steps of receiving a request for assistance from said user, accessing said software tool with a customer care role having a view functionality only limitation, and simulating said first role and said qualification while operating in said customer care role, to assist said user. In the preferred embodiment, the simulation functionalities that the customer care role has, enable that customer care role to simulate update and create functionalities. Also, preferably, the customer care role may use the user's identification to obtain access to the software tool.

17 Claims, 2 Drawing Sheets

(56) References Cited

OTHER PUBLICATIONS

"Accounting Management for Global Broadband Connectivity Services" *Ingo Busse*, (1998) IEEE, pp. 159-168.

"Requirements for Components of an Intelligent Information Retrieval Model for the WWW", *Abdel-Rahman Tawil and Wernher Behrendt* (1997), 4 pages.

* cited by examiner

SIMULATION OF COMPUTER APPLICATION FUNCTION TO ASSIST A USER

BACKGROUND OF THE INVENTION

1. Field of the Invention

This invention generally relates to methods and systems for assisting individuals who are using computer applications. More specifically, the invention relates to methods and systems that enable a person to simulate certain functions of a computer application in order to help a second person use that application.

2. Background Art

Many companies provide individuals, or "help desks," to help people use computer application programs. Helping these people use these programs can be complicated if use of the program is restricted or if certain aspects of the program are secure or confidential. On the one hand, it is desirable that the helper have access to as much information and to as many of the application functions as is necessary in order for that person to provide the needed help. On the other hand, in order to maintain security and confidentiality, it is desirable to minimize the amount of secure and confidential information provided to the helper.

A case in point is the WOI (Web Order and Invoice) application, which is an Internet accessible application developed and hosted by the International Business Machines, Corp. (IBM). This application is secured via the HTTPS protocol. Access to the WOI application is authorized by IBM procurement to a supplier of IBM. Employees of the supplier can then enroll for access to WOI for only those IBM supplier numbers that represent that supplier's company. The supplier employee enrollment applications are approved by an employee of the supplier company.

When the WOI coordinator employed by the IBM supplier approves the other supplier employee enrollment requests, the coordinator is not only granting access to the WOI application for that employee, he is granting access to a specific list of IBM supplier numbers that together represent the IBM suppliers and also giving that employee a specific role(s) assignment. The role(s) assignments are part of the WOI application to facilitate a separation of duties at the supplier. The available WOI roles are AR (Accounts Receivable), Sales (Sales Order Processing) and WOI T&Cs Accept (Accept WOI Application Terms and Conditions).

Given the complexity of the WOI authorization scheme to documents of a specific business nature (Purchase Orders, Invoice, Credits, Invoice Rejects, Remittance Advices and WOI T & C Conditions) by individual IBM supplier numbers that make up a Supplier's Company, a technique of simulation of the end user's view of the data to an employee of the WOI help desk is needed.

SUMMARY OF THE INVENTION

An object of this invention is to improve procedures for helping people use computer application programs.

Another object of the present invention is to enable help desk employees to assist users of computer application programs without needing the password of the person asking for help.

A further object of the invention is to provide a help desk employee with the ability to simulate the environment of a person asking for help, with all update functionality removed.

These and other objectives are attained with a method and system for assisting a user having a role and a qualification. In accordance with this method, a software tool is provided that is adapted to limit a user to a functional limitation predefined by a first role and a data access limitation predefined by a qualification. The method comprises the steps of receiving a request for assistance from said user, accessing said software tool with a customer care role having view and simulation functionalities, and simulating said first role and said qualification while operating in said customer care role, to assist said user.

In the preferred embodiment, the simulation functionalities that the customer care role has enabled to simulate update and create functionalities. Also, in a preferred embodiment, the customer care role may use the user's identification to obtain access to the software tool. For example, the customer care role may use the user's identification to obtain access to the software tool for building a group number from the user identification. The group number is used to provide the customer care role with access to the view and simulation functionalities.

Further benefits and advantages of the invention will become apparent from a consideration of the following detailed description, given with reference to the accompanying drawings, which specify and show preferred embodiments of the invention.

DETAILED DESCRIPTION OF THE PREFERRED EMBODIMENT

Figure 1:
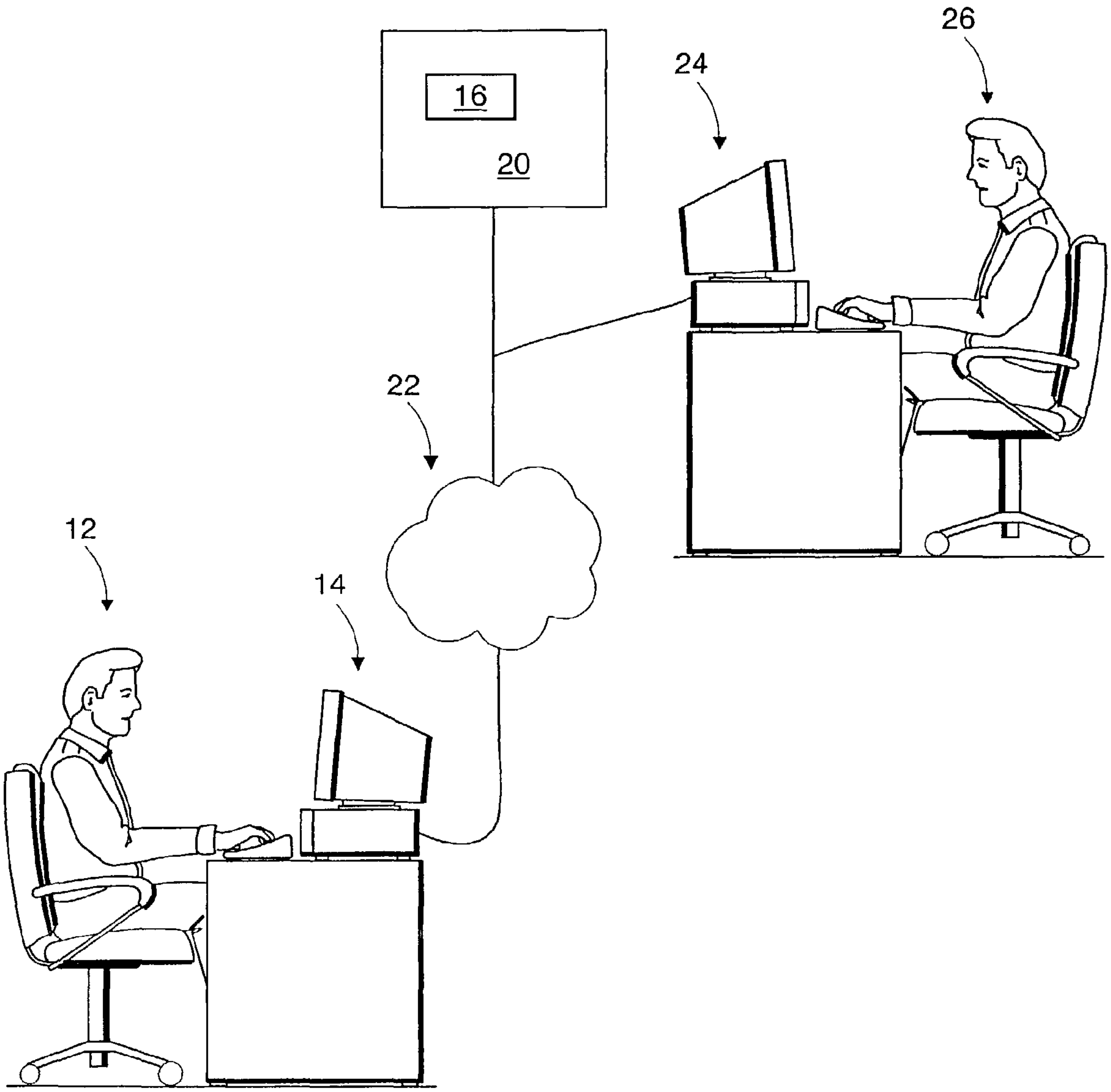
FIG. 1 illustrates an Internet environment in which the present invention may be used.

The present invention, generally, relates to helping individuals use computer application programs, and the invention, more particularly, may be used to help individuals who are accessing such applications via the Internet. FIG. 1 shows an Internet environment in which this invention may be implemented.

More specifically, FIG. 1 shows a user 12 having a personal computer 14 for accessing an application 16, running on server 20, via the Internet 22. A help desk 24, operated by an individual 26 also having a personal computer 30, is provided to help the user 12 work with the application 16. The help desk 24 and user 12 can communicate directly with each other, and both have at least limited access to application 16. Also, both personal computers 14 and 30 may be standard PCs, including a central processing unit, a monitor, a keyboard, and a mouse or other pointing device.

As mentioned above, there are situations in which it would be helpful to simulate the end user's 12 view of the data to the person 26 at the help desk 24. For example, given the complexity of the WOI authorization scheme to documents of a specific business nature, such a simulation would be very useful to a help desk that assists users of the WOI application.

Figure 2:
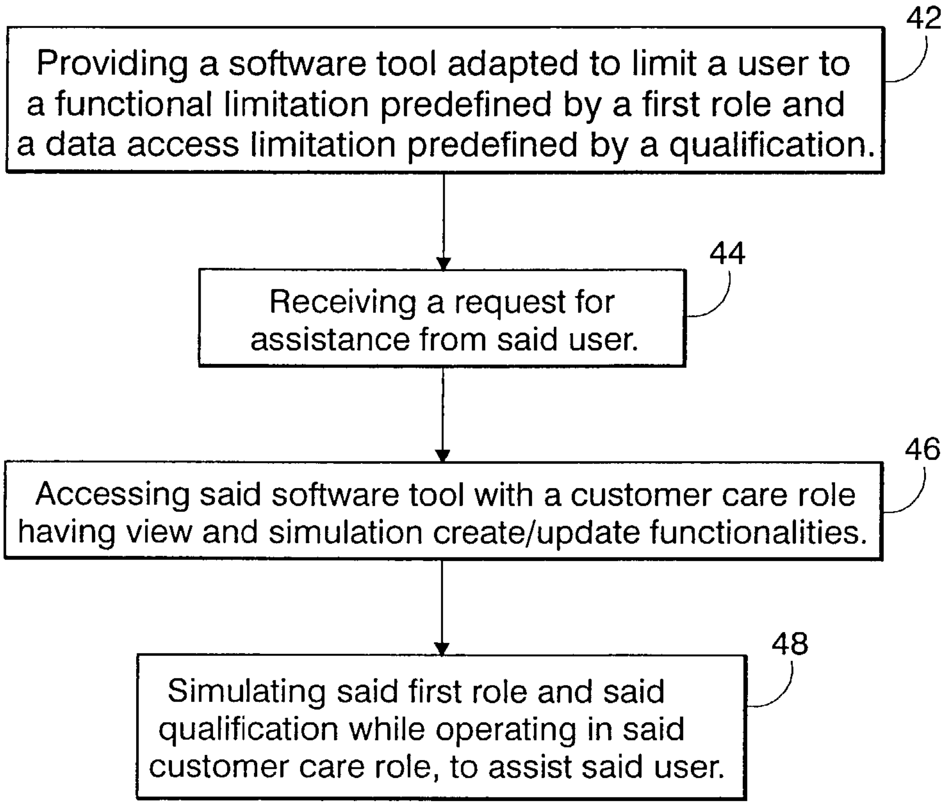
FIG. 2 is a flow chart showing a preferred procedure for carrying out this invention.

With reference to FIG. 2, to provide this simulation, in accordance with this invention, a software tool, which may be part of the WOI, is provided, at step 42, to limit a user to a functional limitation predefined by a first role and a data access limitation predefined by a qualification. Then, when a request for assistance is received, at step 44, from a user, the software tool is accessed, at step 46, with a customer care role having view and update/create simulation functionalities; and, at step 48, the first role and the qualification are simulated while operating in the customer care role, to assist the user. Preferably, the customer care role may be limited to these view and update/create simulation functionalities.

Also in the preferred embodiment, the person on the WOI help desk 24 has a role referred to as CustCare (Customer Care) in the WOI application. This role actually has no authority to any IBM supplier's data or any WOI supplier roles of AR, Sales or WOI T&C Accept. When a help desk employee 26 authenticates via HTTPS to the WOI application, the WOI application determines the person has the WOI role of customer care and prompts the help desk employee to enter the user id of the person that is requesting help. The WOI application then builds the qualified IBM supplier number list from the user id that was entered. This gives the help desk employee 26 access to view business documents and simulate document create and update to which the person requesting help has access.

The WOI application then only gives the help desk employee 26 view functions for which the person 12 requesting help has access. Access to any WOI functions that cause POs to be Accepted or Rejected, Invoices to be Submitted or Edited, WOI T&Cs to be accepted or declined, and changing a document's status in any way which the person 12 asking for help may have are simulations to the help desk employee 26. The end result of this authentication process for the WOI help desk employee 26 is a simulated environment of the person asking for help with all update functionality removed.

An important advantage to this technique is that many problems can be investigated by the help desk employee 26 without requesting the user id and password of the person 12 asking for help. The authentication and configuration look and feel of the WOI application can be simulated by the person 26 on the help desk 24, and the security of the supplier's data is not compromised by sharing a password with the help desk employee.

While it is apparent that the invention herein disclosed is well calculated to fulfill the objects stated above, it will be appreciated that numerous modifications and embodiments may be devised by those skilled in the art, and it is intended that the appended claims cover all such modifications and embodiments as fall within the true spirit and scope of the present invention.

What is claimed is:

1. A method of assisting a user use a computer application program, wherein the computer application program is on a server, and the computer application program includes a software tool for limiting access to the computer application program, the method comprising the steps of:

said user using a computer to access the computer application program over the internet using a user identification and password associated with said user;

said software tool limiting access of the user to the computer application program to a functional limitation predefined by a first role of the user and a data access limitation predefined by a qualification of the user;

a help person receiving a request for assistance from the user;

said help person accessing said software tool over the internet with a customer care role having view and update and create simulation functionalities, including the step of said computer application program giving the help person access to view documents and to simulate document create and update to which the user has access, by use of the user identification, wherein the computer application program gives the help person access to view documents and to simulate document create and update to which the user has access without using the password;

said software tool providing said help person with the ability to simulate a given role of the user, whereby the help person is provided with the ability to simulate (i) said defined functional access to the computer application program, and (ii) said defined data access to the computer application program;

said help person simulating said first role and the qualification via the computer application program, while operating in said customer care role, to assist the user; and limiting said customer care role to said view simulation functionalities, with all update functionality removed.

2. A method according to claim 1, wherein:

the software tool provides the user with access to a defined set of views and provides the customer care role with access to the defined set of views.

3. A method according to claim 2, wherein the user has an identification, and wherein:

the receiving step includes the step of, the user providing the customer care role with the user's identification; and the accessing step includes the step of, the customer care role using the user's identification to obtain access to the software tool.

4. A method according to claim 3, wherein the user is a member of a defined group, and wherein the accessing step includes the further steps of:

using the software tool for:

building a group number from the user identification, and using the group number to provide the customer care role with access to the view and simulation functionalities.

5. A method according to claim 1, wherein the given role and a qualification of the user are assigned to the user by the software tool.

6. A method according to claim 1, wherein:

the step of said software tool providing includes the help person receiving from the user a user identification;

the providing step includes the step of the software tool prompting the help person for the user identification; and the simulating step includes the steps of the software tool building a supplier number list from the user identification, and giving the help person access to view business documents and simulate document create and update to which the user has access.

7. The method of claim 1, wherein the computer application program is a Web Order and Invoice application, and said defined functional access to the computer application program includes functions that cause purchase orders to be accepted or rejected, invoices to be submitted or edited, Accept Web Order and Invoice application terms and conditions, and said defined data access to the computer application program includes access to supplier number list, and the computer application program builds the supplier number list using said user identification and simulates environment of the user.

8. A system for assisting a user use a computer application program, wherein the computer application program is on a server, the system comprising:

a software tool in the computer application program to limit access of the user to the computer application program over the internet to a functional limitation predefined by a first role of the user and a data access limitation predefined by a qualification of the user, the user accessing the computer application program by user identification and password; and a help desk having a help person for receiving a request for assistance from the user and for accessing said software tool over the internet with a customer care role having view and update and create simulation for functionalities, said computer application program giving the help person access to view documents and to simulate document create and update to which the user has access, by use of the user identification, wherein the computer application program gives the help person access to view documents and to simulate document create and update to which the user has access without using the password;

said help person simulating said first role and qualification, while operating in said customer care role, to assist the user, with all update functionality removed; and said customer care role being limited to said view and simulation functionalities.

9. A system according to claim 8, wherein:

the software tool provides the user with access to a defined set of views; and the software tool includes means for providing the customer care role with access to the defined set of views.

10. A system according to claim 9, wherein the user has an identification, and wherein:

the help desk includes means for providing the customer care role with the user's identification; and the help desk includes means for using the user's identification to obtain access to the software tool.

11. A system according to claim 10, wherein the user is a member of a defined group, and wherein the software tool includes means for building a group number from the user identification, and for using the group number to provide the customer care role with access to the view and simulation functionalities.

12. A system according to claim 8, wherein a given role and a qualification of user are assigned to the user by the software tool.

13. A program storage device readable by machine, tangibly embodying a program of instructions executable by the machine to perform method steps for assisting a user use a computer application program, wherein the computer application program is on a server, and the computer application program includes a software tool for limiting access to the computer application program, said method steps comprising:

said user using a computer to access the computer application program over the internet using a user identification and password associated with said user;

using the software tool for limiting access of the user to the computer application program to a functional limitation predefined by a first role of the user and a data access limitation predefined by a qualification of the user;

enabling a help person to receive a request for assistance from the user;

enabling said help person to access said software tool over the interne with a customer care role having view and update and create simulation for functionalities, including the step of said computer application program giving the help person access to view documents and to simulate document create and update to which the user has access, by use of the user identification, wherein the computer application program gives the help person access to view documents and to simulate document create and update to which the user has access without using the password;

enabling said help person to simulate said role and the qualification, while operating in said customer care role, to assist the user, with all update functionality removed; and limiting said customer care role to said view simulation functionalities.

14. A program storage device according to claim 13, wherein the software tool provides the user with access to a defined set of views; and wherein:

the step of enabling the help person to use said software tool includes the step of providing the customer care role with access to the same defined set of views.

15. A program storage device according to claim 14, wherein the user has an identification, and wherein:

the step of enabling the help person to receive a request includes the step of, the user providing the customer care role with the user's identification; and the step of enabling the help person to access said software tool includes the step of, the customer care role using the user's identification to obtain access to the software tool.

16. A program storage device according to claim 15, wherein the user is a member of a defined group, and wherein the step of enabling the help person to access said software tool includes the further steps of:

using the software tool for:

building a group number from the user identification, and using the group number to provide the customer care role with access to view and simulation functionalities.

17. A program storage device according to claim 13, wherein a given role and a qualification of the user are assigned to the user by the software tool.

* * * * *